US012570012B2

(12) United States Patent
Chen et al.

(10) Patent No.: US 12,570,012 B2
(45) Date of Patent: Mar. 10, 2026

(54) ROBOT SYSTEM AND METHOD FOR CREATING VISUAL RECORD OF TASK PERFORMED IN WORKING AREA

(71) Applicant: URSrobot AI Inc., Taipei City (TW)

(72) Inventors: Chien-Tung Chen, Taipei City (TW); Chung-Hou Wu, Taipei City (TW); Chao-Cheng Chen, Taipei City (TW)

(73) Assignee: URSrobot AI Inc., Taipei City (TW)

( * ) Notice: Subject to any disclaimer, the term of this patent is extended or adjusted under 35 U.S.C. 154(b) by 136 days.

(21) Appl. No.: 18/407,680

(22) Filed: Jan. 9, 2024

(65) Prior Publication Data

US 2024/0238995 A1 Jul. 18, 2024

(30) Foreign Application Priority Data

Jan. 12, 2023 (TW) ................................. 112101308

(51) Int. Cl.
B25J 19/02 (2006.01)
(52) U.S. Cl.
CPC .................................... B25J 19/023 (2013.01)
(58) Field of Classification Search
CPC .... G05D 1/0246; G05D 1/0274; G05D 1/648; G05D 1/246; G05D 1/689; G05D 2105/15; G05D 2107/23; G05D 2109/10; G05D 1/0212; G05D 1/0238; A01D 2101/00; A01D 34/008; A01D 43/00; G06T 2207/30188; G06T 2207/20081; G06T 7/11; G06V 10/56; G06V 10/70; B25J 19/023
See application file for complete search history.

(56) References Cited

U.S. PATENT DOCUMENTS

| | | | | |
|---|---|---|---|---|
| 11,140,813 B1 * | 10/2021 | Morrison | ............... | G06N 20/00 |
| 11,199,853 B1 * | 12/2021 | Afrouzi | .................. | B25J 13/006 |
| 2019/0278269 A1 * | 9/2019 | He | ........................ | G05D 1/0225 |
| 2022/0044410 A1 * | 2/2022 | Wu | ......................... | G06T 7/162 |
| 2022/0167552 A1 * | 6/2022 | Frick | .................... | A01D 34/008 |
| 2022/0270250 A1 * | 8/2022 | Glenn | .................. | G06V 20/188 |

OTHER PUBLICATIONS

Turf Analyzer Wayback Machine Recorded NPL from Jul. 6, 2022—Green Research Services LLC (Year: 2022).*
A novel solution with rapid Voronoiâbased coverage path planning in irregular environment for robotic mowing systems—Huang et al.—Published Aug. 31, 2021 (Year: 2021).*
Mobile Robot Path Planning using Voronoi Diagram and Fast Marching—Garrido et al. (May 2015) (Year: 2015).*

* cited by examiner

*Primary Examiner* — Abby Lin
*Assistant Examiner* — Kayla R Doros
(74) *Attorney, Agent, or Firm* — Blank Rome LLP

(57) ABSTRACT

A method includes steps of: receiving map data that contains a map of a working area, the map of the working area being at least defined within a closed outer boundary; generating a Voronoi diagram based on the outer boundary, the Voronoi diagram including at least one Voronoi cell having an edge that is composed of a plurality of Voronoi points; selecting at least one of the Voronoi points as a target point; and capturing, at a target location in the working area that corresponds to the target point in the Voronoi diagram, an image of the working area to serve as the visual record.

18 Claims, 4 Drawing Sheets

ROBOT SYSTEM AND METHOD FOR CREATING VISUAL RECORD OF TASK PERFORMED IN WORKING AREA

CROSS-REFERENCE TO RELATED APPLICATION

This application claims priority to Taiwanese Invention Patent Application No. 112101308, filed on Jan. 12, 2023.

FIELD

The disclosure relates to a robot system and a method for creating a visual record of a task performed in a working area.

BACKGROUND

Robots have been widely utilized to perform a variety of tasks (e.g., lawn mowing) for task automation.

SUMMARY

Therefore, an object of the disclosure is to provide a robot system and a method for creating a visual record of a task performed in a working area.

According to one aspect of the disclosure, the robot system includes a cloud server and a robot.

The robot includes an image capturing device, a driving device, a communication device that is in communication with the cloud server, and a processor that is electrically connected to the image capturing device, the driving device and the communication device.

One of the cloud server and the processor serves as a computing unit. The computing unit is configured to receive map data that contains a map of a working area. The map of the working area is at least defined within a closed outer boundary.

The computing unit is configured to generate a Voronoi diagram based on the outer boundary. The Voronoi diagram includes at least one Voronoi cell having an edge that is composed of a plurality of Voronoi points.

The computing unit is configured to select at least one of the Voronoi points as a target point, to control the driving device to drive the robot to move to a target location in the working area that corresponds to the target point in the Voronoi diagram, and to control the image capturing device to capture, at the target location, an image of the working area to serve as a visual record of a task performed in the working area.

According to another aspect of the disclosure, the method includes steps of:

receiving map data that contains a map of the working area, the map of the working area being at least defined within a closed outer boundary;

generating a Voronoi diagram based on the outer boundary, the Voronoi diagram including at least one Voronoi cell having an edge that is composed of a plurality of Voronoi points;

selecting at least one of the Voronoi points as a target point; and capturing, at a target location in the working area that corresponds to the target point in the Voronoi diagram, an image of the working area to serve as the visual record.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
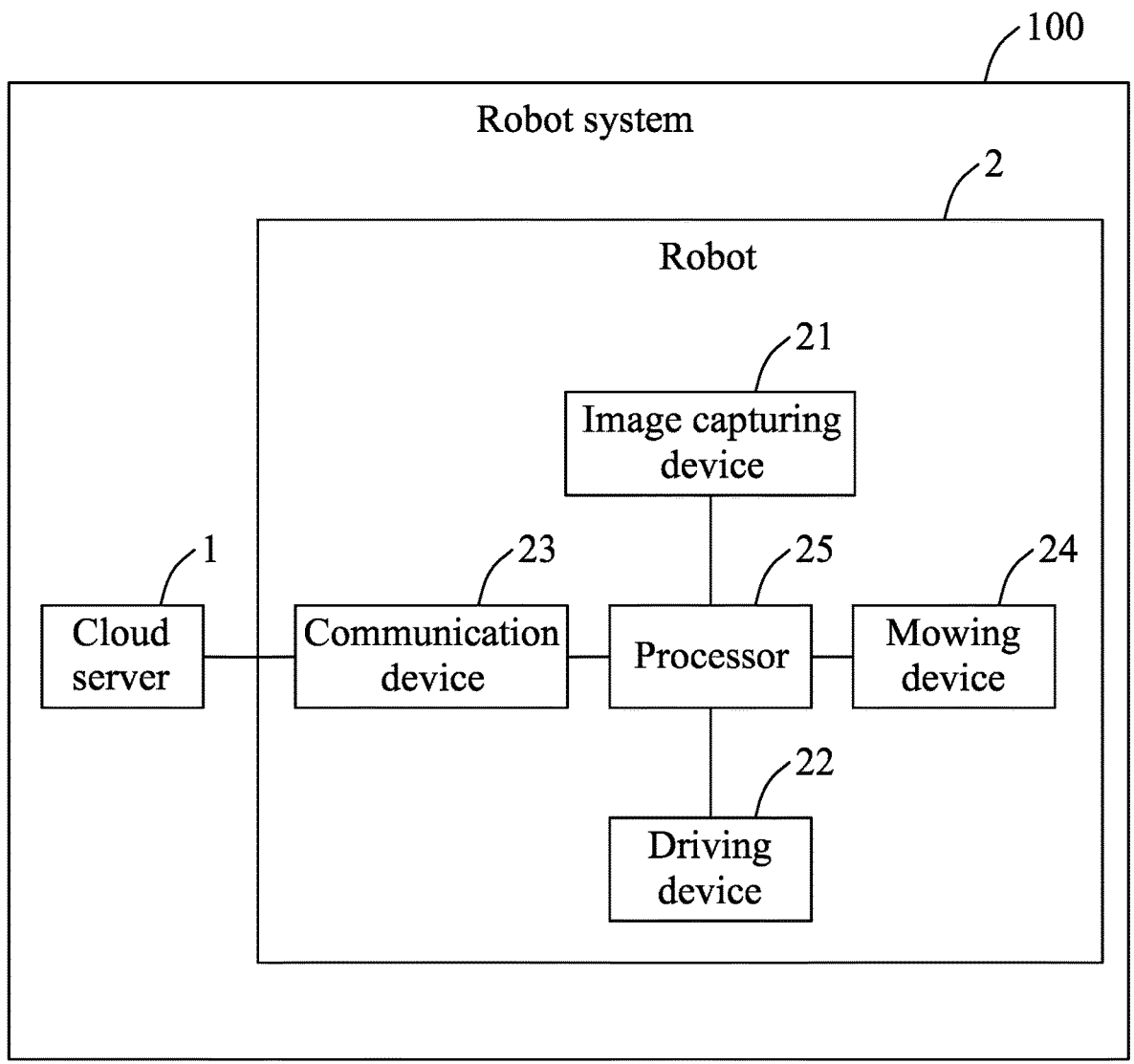
FIG. 1 is a block diagram illustrating a robot system according to an embodiment of the disclosure.

Referring to FIG. 1, an embodiment of a robot system 100 according to the disclosure is illustrated. The robot system 100 includes a cloud server 1 and a robot 2. The robot system 100 is configured to perform a task (e.g., lawn mowing) in a working area. For example, the working area is a lawn of a golf field, a park, etc., but is not limited thereto.

The robot 2 includes an image capturing device 21, a driving device 22, a communication device 23 that is in communication with the cloud server 1, and a processor 25 that is electrically connected to the image capturing device 21, the driving device 22 and the communication device 23.

In one embodiment where the robot 2 is implemented to be a robotic lawn mower, the robot further includes a mowing device 24 that is electrically connected to the processor 25. The mowing device 24 includes lawn mower blades (not shown).

In one embodiment where the robot 2 is implemented to be a sweeping robot or a robot vacuum cleaner, the robot may further include a sweeper, a suctioning device and a dust bag.

The image capturing device 21 may be implemented by a camera, a video recorder or the like.

The driving device 22 is configured to be controlled by the processor 25 to make the robot 2 move. The driving device 22 may be implemented to include a motor, and a plurality of wheels that are driven by the motor.

The communication device 23 is implemented to be a network interface controller or a wireless transceiver that supports wireless communication standards, such as Bluetooth® technology standards, Wi-Fi technology standards and/or cellular network technology standards, but is not limited thereto. In some embodiments, the communication device 23 may include a mobile communication module supporting telecommunication using the third generation (3G), the fourth generation (4G) and/or fifth generation (5G) of wireless mobile telecommunication technology, and/or the like, but is not limited thereto.

The processor 25 may be implemented by a single-core/ multi-core central processing unit (CPU), a microprocessor, a micro control unit (MCU), a digital signal processor (DSP), a field programmable gate array (FPGA), an application specific integrated circuit (ASIC), a system on a chip (SoC), or any circuit configurable/programmable in a software manner and/or hardware manner to implement functionalities discussed in this disclosure.

Figure 3:
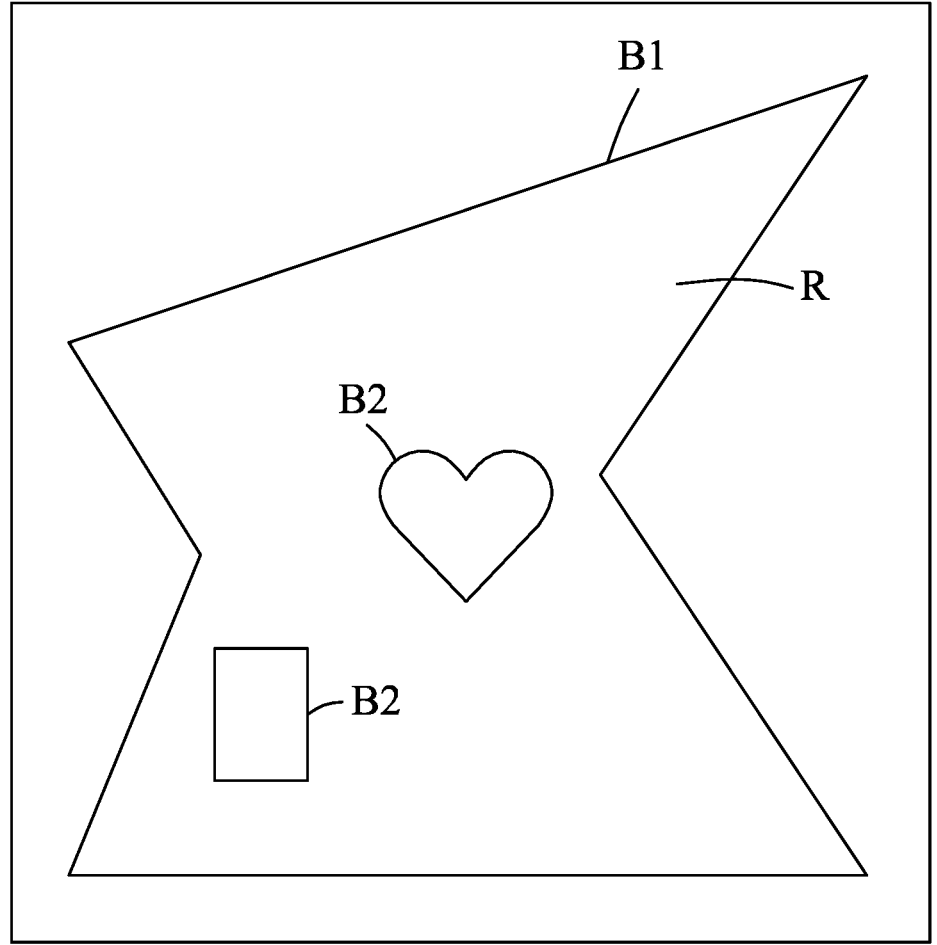
FIG. 3 is a schematic diagram illustrating an example of a map of the working area according to an embodiment of the disclosure.

One of the cloud server 1 and the processor 25 serves as a computing unit. The computing unit is configured to receive map data that contains a map of the working area (R) as shown in FIG. 3. For example, the map data is planned by a user using a user device in advance. The map of the working area (R) is at least defined within a closed outer boundary (B1). It is worth to note that in a scenario where the processor 25 serves as the computing unit, the cloud server 1 first receives the map data from the user device, and then the processor 25 receives the map data via the communication device 23 from the cloud server 1.

Figure 4:
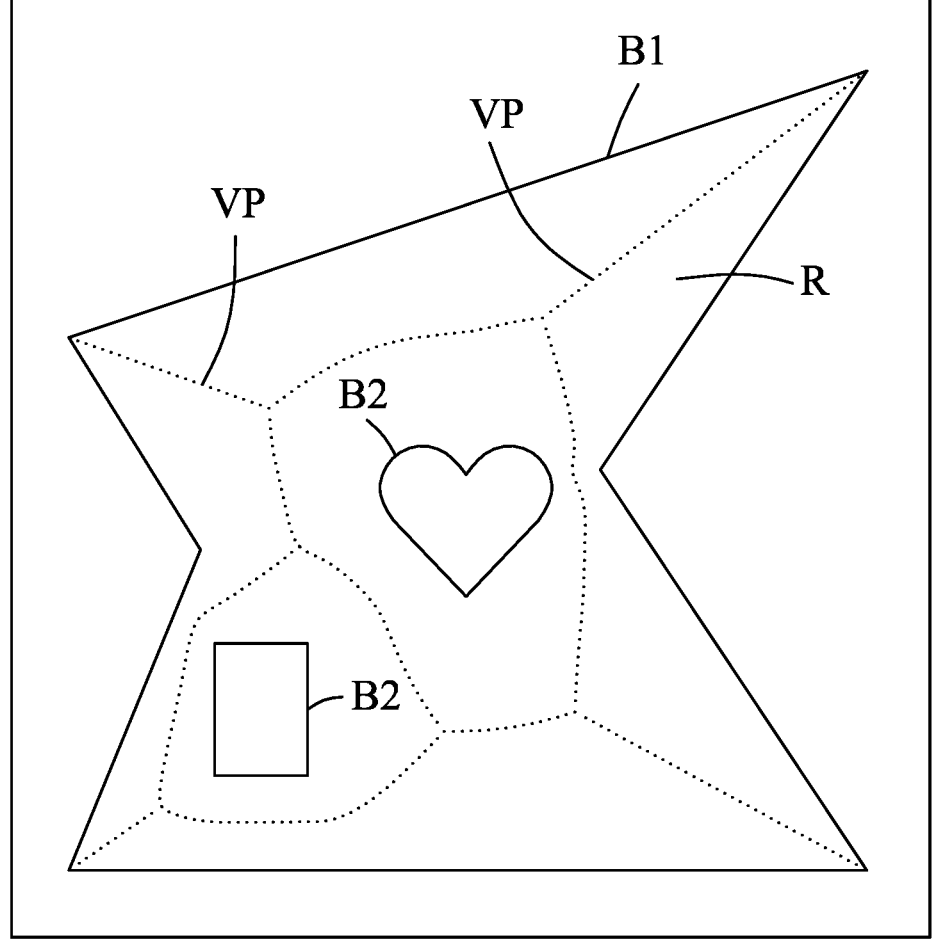
FIG. 4 is a schematic diagram illustrating an example of a Voronoi diagram related to the map shown in FIG. 3.

In one embodiment where the map of the working area (R) is further defined beyond closed inner boundaries (B2) as shown in FIG. 3, the computing unit is configured to generate a Voronoi diagram as shown in FIG. 4 based on the outer boundary (B1) and the inner boundaries (B2). The Voronoi diagram includes at least one Voronoi cell having an edge that is composed of a plurality of Voronoi points (VP). Since implementation of generating a Voronoi diagram is well known to one skilled in the relevant art, detailed explanation of the same is omitted herein for the sake of brevity.

The computing unit is configured to select at least one of the Voronoi points (VP) as a target point. Specifically, the computing unit is configured to, for each of the Voronoi points (VP) in the Voronoi diagram, calculate a shortest distance between the Voronoi point (VP) and the outer boundary (B1) and a shortest distance between the Voronoi point (VP) and the inner boundaries (B2). The computing unit is further configured to select a smaller distance for each of the Voronoi points (VP), where the smaller distance is a smaller one of the shortest distance between the Voronoi point (VP) and the outer boundary (B1) and the shortest distance between the Voronoi point (VP) and the inner boundaries (B2). The computing unit is further configured to select, from among the Voronoi points (VP), one of the Voronoi points (VP) that has a greatest one of the smaller distances that are selected respectively for the Voronoi points (VP) as the target point.

In one embodiment where the map of the working area (R) is only defined by the outer boundary (B1), the computing unit is configured to generate the Voronoi diagram only based on the outer boundary (B1). Then, the computing unit is configured to, for each of the Voronoi points (VP) in the Voronoi diagram, calculate a shortest distance between the Voronoi point (VP) and the outer boundary (B1). The computing unit is further configured to select, from among the Voronoi points (VP), one of the Voronoi points (VP) that has a greatest one of the shortest distances that are calculated respectively for the Voronoi points (VP) as the target point.

In one embodiment, the working area covers a plurality of geographical points, and the map data contains, for each of the geographical points, a longitude and a latitude. The computing unit is configured to select, from among the Voronoi points (VP), one of the Voronoi points (VP) corresponding to one of the geographical points that has at least one of a greatest one of the longitudes among the geographical points, a smallest one of the longitudes among the geographical points, a greatest one of the latitudes among the geographical points or a smallest one of the latitudes among the geographical points as the target point. For example, in a scenario where four Voronoi points (VP) respectively correspond to four geographical points that respectively have the greatest longitude, the smallest longitude, the greatest latitude and the smallest latitude, the computing unit would select the four Voronoi points (VP) respectively as four target points. In another scenario where one Voronoi point (VP) corresponds to a geographical point that has the greatest longitude and the greatest latitude and another Voronoi point (VP) corresponds to another geographical point that has the smallest longitude and the smallest latitude, the computing unit would select the two Voronoi points (VP) respectively as two target points. Hereinafter, such way of selecting a target point is referred to as a geographical approach.

It is worth to note that in order to improve efficiency of selecting the target point from among the Voronoi points (VP), after generating the Voronoi diagram and prior to selecting the target point, the computing unit performs downsampling on the Voronoi points (VP) (i.e., to select only a part of the Voronoi points (VP) for further processing) to decrease a total number of the Voronoi points (VP). For example, the computing unit selects one out of every ten of the Voronoi points (VP) that are immediately adjacent to each other. In this way, the computational load of selecting the target point from among the Voronoi points (VP) may be decreased.

The computing unit is configured to control the driving device 22 to drive the robot 2 to move to a target location in the working area that corresponds to the target point in the Voronoi diagram, and to control the image capturing device 21 to capture, at the target location, an image of the working area to serve as a visual record of a task performed in the working area. Specifically, in a scenario where the cloud server 1 serves as the computing unit, the cloud server 1 generates a driving signal that is related to the target location, and transmits the driving signal to the processor 5 via the communication device 23 so as to enable the processor 5 to control the driving device 22 to drive the robot 2 to move to the target location and to capture the image.

In one embodiment, the computing unit controls the driving device 22 to drive the robot 2 to rotate at the target location and, at the same time, controls the image capturing device 21 to capture images for creating a panorama image. In some embodiments, the image capturing device 21 is capable of creating the panorama image without rotation of the robot 2.

It is worth to note that by virtue of property of the Voronoi diagram that each of the Voronoi points is equally spaced apart from boundaries that are nearest to the Voronoi point, the image of the working area would contain a relatively larger work-region part that corresponds to the working area and a relatively smaller non-work-region part that does not correspond to the working area, thus enhancing completeness of the record of the task performed in the working area. At the same time, a relatively central part of the working area may be recorded in the image of the working area.

Moreover, in a scenario where the aforementioned geographical approach is used to select the target point, a relatively peripheral part of the working area may be recorded in the image of the working area. Therefore, an entirety of the working area may be recorded in detail.

In one embodiment where the robot 2 is a robotic lawn mower and the working area is a lawn, the computing unit is further configured to determine a work-region part of the image of the working area that corresponds to the working area (for example, such determination is made based on visual features such as colors and shapes of plants), to determine an area of the work-region part, to determine a grass-covered sub-part of the work-region part that satisfies a color criterion (e.g., a portion of the work-region part that has a color of green identical to that of a healthy lawn will be determined as the grass-covered sub-part), to determine an area of the grass-covered sub-part, and to divide the area of the grass-covered sub-part by the area of the work-region part to obtain a lawn-health value. The determination of the work-region part of the image of the working area and the grass-covered sub-part of the work-region part may be implemented by techniques of image identification. It is worth to note that the healthier the lawn is, the larger a grass-covered part (which has the color of green) of the lawn is; the unhealthier the lawn is, the larger a grass-uncovered part (which has an earthy color) of the lawn is. Consequently, the lawn-health value may effectively reflect a degree of health of the lawn.

It should be noted that the way of determining the lawn-health value is not limited to the abovementioned disclosure. For example, the lawn-health value may be obtained by techniques of artificial intelligence (AI). In one embodiment where the robot 2 is a robotic lawn mower and the working area is the lawn, the computing unit is further configured to establish an estimating model based on a training set that contains a plurality of training images and a plurality of training values respectively corresponding to the training images and being related to the health of the lawn. The estimating model is a convolution neural network. After the estimating model has been established, the computing unit is configured to feed a target image of the working area into the estimating model to obtain the lawn-health value that is related to the target image. Hereinafter, such way of determining the lawn-health value is referred to as an AI approach.

It should be noted that a number of the target location selected by the computing unit is not limited to one. That is to say, in one embodiment, the computing unit is configured to select multiple ones of the Voronoi points (VP) respectively as target points, and to capture, respectively at a plurality of target locations in the working area that respectively correspond to the target points in the Voronoi diagram, images of the working area to serve as the visual records that respectively correspond to the target points. The computing unit is further configured to calculate an average of the lawn-health values that are obtained respectively based on the visual records. It should be noted that lawn-health values determined by the AI approach may be used to calculate the average of the lawn-health values.

In one embodiment, the computing unit is configured to calculate a first average of lawn-health values at an earlier time instance and to calculate a second average of lawn-health values at a later time instance. The computing unit is further configured to perform smooth filtering on the first and second averages of lawn-health values to obtain a smoothed average of the lawn-health values. Specifically, the computing unit multiplies the first average of the lawn-health value by a first predetermined weight (e.g., 0.2) to generate a first product, multiplies the second average of the lawn-health value by a second predetermined weight (e.g., 0.8) to generate a second product, and calculate a sum of the first and second products to obtain the smoothed average of the lawn-health values. In this way, influence caused by occasional variations (e.g., variations in weather, climate and illumination) on the smoothed average of the lawn-health values may be reduced. It should be noted that the lawn-health values determined by the AI approach may be used to determine the smoothed average of the lawn-health values.

Figure 2:
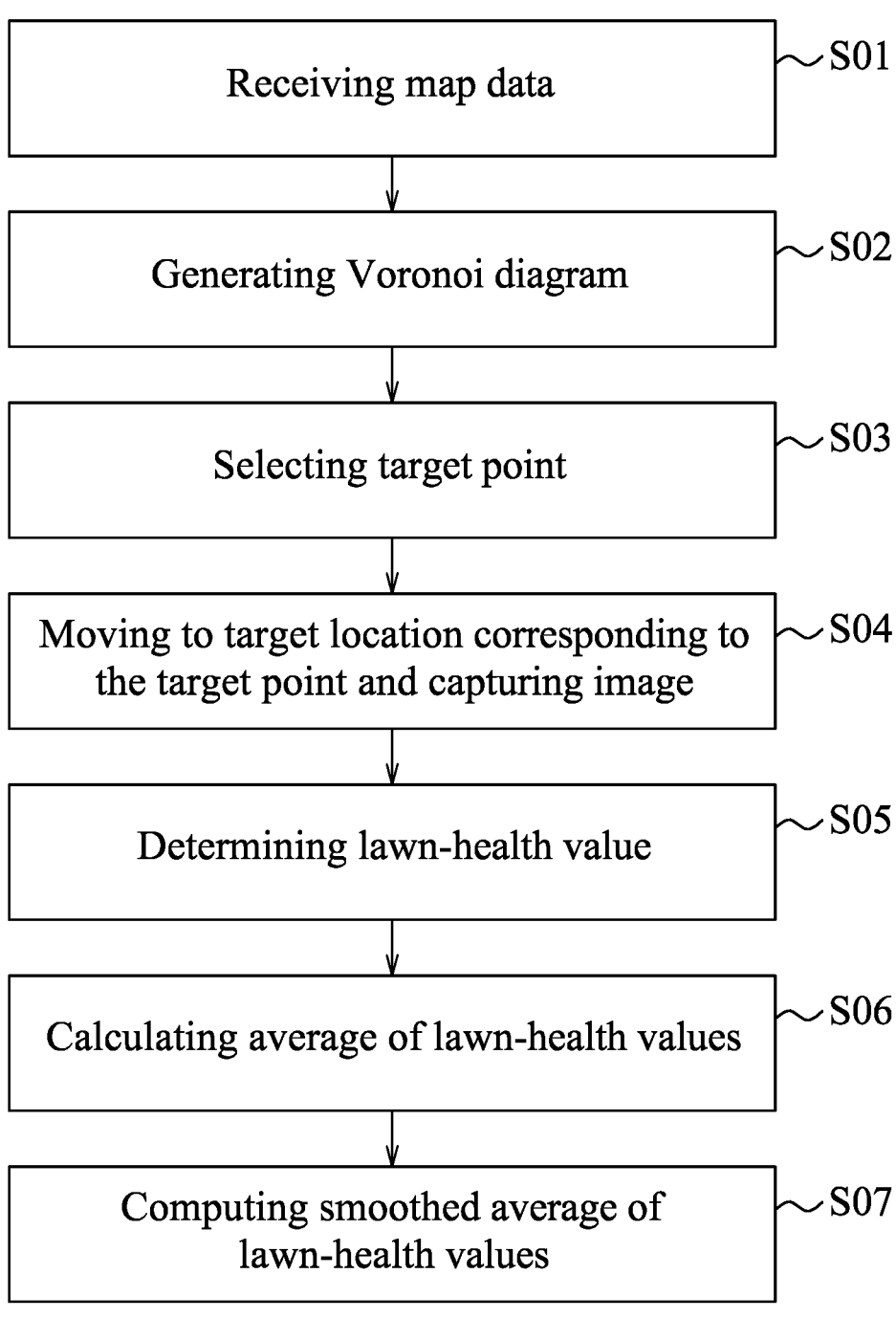
FIG. 2 is a flow chart illustrating a method for creating a visual record of a task performed in a working area according to an embodiment of the disclosure.

Referring to FIG. 2, an embodiment of a method for creating a visual record of a task performed in a working area according to the disclosure is illustrated. The method is to be implemented by the computing unit of the robot system 100 that is previously described. The method includes steps S01 to S04 delineated below.

In step S01, the computing unit receives the map data that contains the map of the working area (R) as exemplarily shown in FIG. 3.

In step S02, the computing unit generates a Voronoi diagram as exemplarily shown in FIG. 4 based on the outer boundary (B1) and the inner boundaries (B2).

In step S03, the computing unit selects at least one of the Voronoi points (VP) as a target point.

In step S04, the computing unit controls the driving device 22 to drive the robot 2 to move to the target location in the working area that corresponds to the target point in the Voronoi diagram, and to capture, at the target location, an image of the working area to serve as the visual record.

In one embodiment where the robot 2 is a robotic lawn mower and the working area is a lawn, the method optionally includes step S05 subsequent to step S04. In step S05, the computing unit determines a lawn-health value for the visual record.

In one embodiment where multiple ones of the Voronoi points (VP) are selected respectively as target points and multiple ones of the visual records are accordingly obtained, the method optionally includes step S06 subsequent to step S05. In step S06, the computing unit calculates an average of the lawn-health values that are obtained respectively based on the visual records.

In one embodiment where a first average of lawn-health values is calculated at an earlier time instance and a second average of lawn-health values is calculated at a later time instance, the method optionally includes step S07 subsequent to step S06. In step S07, the computing unit performs smooth filtering on the first and second averages of lawn-health values to obtain a smoothed average of the lawn-health values.

It should be noted that in one embodiment, the method is executed once at an end of a task of lawn mowing. In one embodiment, the method is executed twice, wherein once before a task of lawn mowing starts and the other time after the task of lawn mowing ends.

In one embodiment, the cloud server 1 transmits the visual record, the lawn-health value, the average of the lawn-health values and the smoothed average of the lawn-health values to a user terminal (e.g., a smartphone) operated by a user to enable the user terminal to display the same. In one embodiment, the user terminal further display a plot that illustrates a curve representing a history of lawn-health values.

In summary, for the robot system 100 and the method for creating the visual record of the task performed in the working area according to the disclosure, the Voronoi diagram is generated based on the map of the working area, and at least one of the Voronoi points (VP) in the Voronoi diagram is selected as the target point. Then, the robot 2 moves to the target location in the working area that corresponds to the target point in the Voronoi diagram, and captures the image of the working area to serve as the visual record. In this way, automation of creating a visual record of the task performed in the working area is realized.

In addition, by virtue of Voronoi points (VP) in the Voronoi diagram, the image of the working area captured at the target location may have the relatively larger work-region part of the image of the working area that corresponds to the working area and the relatively smaller non-work-region part of the image of the working area that does not correspond to the working area. Thus, the task performed in the working area may be completely recorded. In a scenario where one of the Voronoi points (VP) that has the greatest one of the smaller distances (or the shortest distances) that are selected respectively for the Voronoi points (VP) as the target point, the relatively central part of the working area may be completely recorded in the image of the working area. In a scenario where one of the Voronoi points (VP)

corresponding to one of the geographical points that has at least one of the greatest one of the longitudes among the geographical points, the smallest one of the longitudes among the geographical points, the greatest one of the latitudes among the geographical points or the smallest one of the latitudes among the geographical points as the target point, the relatively peripheral part of the working area may be completely recorded in the image of the working area. Therefore, the entirety of the working area may be recorded as completely as possible.

Moreover, in a scenario where the robot 2 is the robotic lawn mower and the working area is the lawn, the lawn-health value, the average of lawn-health values and the smoothed average of lawn-health values are generated as references for facilitating management of the lawn.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for creating a visual record of a task performed in a working area, the method being implemented by a computing unit of a robot system, the robot system further including a robot that includes an image capturing device, the method comprising steps of:

receiving map data that contains a map of the working area, the map of the working area being at least defined within a closed outer boundary and beyond a closed inner boundary;

generating a Voronoi diagram based on the outer boundary and the inner boundary, the Voronoi diagram including at least one Voronoi cell having an edge that is composed of a plurality of Voronoi points;

selecting at least one of the Voronoi points as a target point;

controlling the image capturing device to capture, at a target location in the working area that corresponds to the target point in the Voronoi diagram, an image of the working area to serve as the visual record;

controlling the robot to move to the target point based on the Voronoi diagram, wherein the step of selecting at least one of the Voronoi points as a target point includes sub-steps of for each of the Voronoi points in the Voronoi diagram, calculating a shortest distance between the Voronoi point and the outer boundary and a shortest distance between the Voronoi point and the inner boundary, selecting a smaller distance for each of the Voronoi points, the smaller distance being a smaller one of the shortest distance between the Voronoi point and the outer boundary and the shortest distance between the Voronoi point and the inner boundary, and selecting, from among the Voronoi points, one of the Voronoi points that has a greatest one of the smaller distances that are selected respectively for the Voronoi points as the target point.

2. A method for creating a visual record of a task performed in a working area, the method being implemented by a computing unit of a robot system, the robot system further including a robot that includes an image capturing device, the method comprising steps of:

receiving map data that contains a map of the working area, the map of the working area being at least defined within a closed outer boundary;

generating a Voronoi diagram based on the outer boundary, the Voronoi diagram including at least one Voronoi cell having an edge that is composed of a plurality of Voronoi points;

selecting at least one of the Voronoi points as a target point;

controlling the image capturing device to capture, at a target location in the working area that corresponds to the target point in the Voronoi diagram, an image of the working area to serve as the visual record; and controlling the robot to move to the target point based on the Voronoi diagram, wherein the step of selecting at least one of the Voronoi points as a target point includes sub-steps of:

for each of the Voronoi points in the Voronoi diagram, calculating a shortest distance between the Voronoi point and the outer boundary; and selecting, from among the Voronoi points, one of the Voronoi points that has a greatest one of the shortest distances that are calculated respectively for the Voronoi points as the target point.

3. A method for creating a visual record of a task performed in a working area, the method being implemented by a computing unit of a robot system, the robot system further including a robot that includes an image capturing device, the method comprising steps of:

receiving map data that contains a map of the working area, the map of the working area being at least defined within a closed outer boundary;

generating a Voronoi diagram based on the outer boundary, the Voronoi diagram including at least one Voronoi cell having an edge that is composed of a plurality of Voronoi points;

selecting at least one of the Voronoi points as a target point;

controlling the image capturing device to capture, at a target location in the working area that corresponds to the target point in the Voronoi diagram, an image of the working area to serve as the visual record; and controlling the robot to move to the target point based on
the Voronoi diagram,
wherein the working area covers a plurality of geographi-
cal points, and the map data contains, for each of the
geographical points, a longitude and a latitude; and
wherein the step of selecting at least one of the Voronoi
points as a target point is to select, from among the
Voronoi points, one of the Voronoi points correspond-
ing to one of the geographical points that has at least
one of a greatest one of the longitudes among the
geographical points, a smallest one of the longitudes
among the geographical points, a greatest one of the
latitudes among the geographical points or a smallest
one of the latitudes among the geographical points as
the target point.

4. The method as claimed in claim 1, the working area
being a lawn, the method further comprising steps of:
determining a work-region part of the image of the
working area that corresponds to the working area;
determining an area of the work-region part;
determining a grass-covered sub-part of the work-region
part that satisfies a color criterion;
determining an area of the grass-covered sub-part; and
dividing the area of the grass-covered sub-part by the area
of the work-region part to obtain a lawn-health value.

5. The method as claimed in claim 4, wherein:
the step of selecting at least one of the Voronoi points as
a target point is to select multiple ones of the Voronoi
points respectively as target points; and
the step of capturing at least one image of the working
area to serve as the visual record is to capture, respec-
tively at a plurality of target locations in the working
area that respectively correspond to the target points in
the Voronoi diagram, images of the working area to
serve as the visual records that respectively correspond
to the target points,
the method further comprising a step of calculating an
average of the lawn-health values obtained respectively
based on the visual records.

6. The method as claimed in claim 5, wherein the step of
calculating an average of lawn-health values is to calculate
a first average of lawn-health values at an earlier time
instance and calculate a second average of lawn-health
values at a later time instance,
the method further comprising a step of performing
smooth filtering on the first and second averages of
lawn-health values to obtain a smoothed average of the
lawn-health values.

7. The method as claimed in claim 1, the working area
being a lawn, the method further comprising steps of:
establishing an estimating model based on a training set
that contains a plurality of training images and a
plurality of training values respectively corresponding
to the training images and being related to health of a
lawn, where the estimating model is a convolution
neural network; and
feeding the image of the working area into the estimating
model to obtain a lawn-health value.

8. A robot system, comprising:
a cloud server; and
a robot including an image capturing device, a driving
device, a communication device that is in communica-
tion with said cloud server, and a processor that is
electrically connected to said image capturing device,
said driving device and said communication device, wherein one of said cloud server and the processor serves
as a computing unit, and said computing unit is con-
figured to
receive map data that contains a map of a working area,
the map of the working area being at least defined
within a closed outer boundary and beyond a closed
inner boundary,
generate a Voronoi diagram based on the outer bound-
ary and the inner boundary, the Voronoi diagram
including at least one Voronoi cell having an edge
that is composed of a plurality of Voronoi points,
select at least one of the Voronoi points as a target point,
control said driving device to drive said robot to move
to a target location in the working area that corre-
sponds to the target point in the Voronoi diagram,
and
control said image capturing device to capture, at the
target location, an image of the working area to serve
as a visual record of a task performed in the working
area,
wherein said computing unit is configured to:
for each of the Voronoi points in the Voronoi diagram,
calculate a shortest distance between the Voronoi
point and the outer boundary and a shortest distance
between the Voronoi point and the inner boundary,
select a smaller distance for each of the Voronoi points,
the smaller distance being a smaller one of the
shortest distance between the Voronoi point and the
outer boundary and the shortest distance between the
Voronoi point and the inner boundary, and
select, from among the Voronoi points, one of the
Voronoi points that has a greatest one of the smaller
distances that are selected respectively for the
Voronoi points as the target point.

9. A robot system, comprising:
a cloud server; and
a robot including an image capturing device, a driving
device, a communication device that is in communica-
tion with said cloud server, and a processor that is
electrically connected to said image capturing device,
said driving device and said communication device,
wherein one of said cloud server and the processor serves
as a computing unit, and said computing unit is con-
figured to
receive map data that contains a map of a working area,
the map of the working area being at least defined
within a closed outer boundary,
generate a Voronoi diagram based on the outer bound-
ary, the Voronoi diagram including at least one
Voronoi cell having an edge that is composed of a
plurality of Voronoi points,
select at least one of the Voronoi points as a target point,
control said driving device to drive said robot to move
to a target location in the working area that corre-
sponds to the target point in the Voronoi diagram,
and
control said image capturing device to capture, at the
target location, an image of the working area to serve
as a visual record of a task performed in the working
area, and
wherein said computing unit is configured to:
for each of the Voronoi points in the Voronoi diagram,
calculate a shortest distance between the Voronoi
point and the outer boundary; and
select, from among the Voronoi points, one of the
Voronoi points that has a greatest one of the shortest distances that are calculated respectively for the Voronoi points as the target point.

10. A robot system, comprising:

a cloud server; and a robot including an image capturing device, a driving device, a communication device that is in communication with said cloud server, and a processor that is electrically connected to said image capturing device, said driving device and said communication device, wherein one of said cloud server and the processor serves as a computing unit, and said computing unit is configured to receive map data that contains a map of a working area, the map of the working area being at least defined within a closed outer boundary, generate a Voronoi diagram based on the outer boundary, the Voronoi diagram including at least one Voronoi cell having an edge that is composed of a plurality of Voronoi points, select at least one of the Voronoi points as a target point, control said driving device to drive said robot to move to a target location in the working area that corresponds to the target point in the Voronoi diagram, and control said image capturing device to capture, at the target location, an image of the working area to serve as a visual record of a task performed in the working area, wherein the working area covers a plurality of geographical points, and the map data contains, for each of the geographical points, a longitude and a latitude; and wherein said computing unit is configured to select, from among the Voronoi points, one of the Voronoi points corresponding to one of the geographical points that has at least one of a greatest one of the longitudes among the geographical points, a smallest one of the longitudes among the geographical points, a greatest one of the latitudes among the geographical points or a smallest one of the latitudes among the geographical points as the target point.

11. The robot system as claimed in claim 8, wherein:

the working area is a lawn;

said computing unit is further configured to determine a work-region part of the image of the working area that corresponds to the working area, determine an area of the work-region part, determine a grass-covered sub-part of the work-region part that satisfies a color criterion, determine an area of the grass-covered sub-part, and divide the area of the grass-covered sub-part by the area of the work-region part to obtain a lawn-health value.

12. The robot system as claimed in claim 11, wherein:

said computing unit is configured to select multiple ones of the Voronoi points respectively as target points, and to capture, respectively at a plurality of target locations in the working area that respectively correspond to the target points in the Voronoi diagram, images of the working area to serve as the visual records that respectively correspond to the target points; and said computing unit is further configured to calculate an average of the lawn-health values obtained respectively based on the visual records.

13. The robot system as claimed in claim 12, wherein said computing unit is configured to calculate a first average of lawn-health values at an earlier time instance and to calculate a second average of lawn-health values at a later time instance, said computing unit is further configured to perform smooth filtering on the first and second averages of lawn health values to obtain a smoothed average of the lawn health values.

14. The robot system as claimed in claim 8, wherein:

the working area is a lawn;

said computing unit is further configured to establish an estimating model based on a training set that contains a plurality of training images and a plurality of training values respectively correspond to the training images and being related to health of a lawn, where the estimating model is a convolution neural network, and feed the image of the working area into the estimating model to obtain a lawn-health value.

15. The method as claimed in claim 2, the working area being a lawn, the method further comprising steps of:

determining a work-region part of the image of the working area that corresponds to the working area;

determining an area of the work-region part;

determining a grass-covered sub-part of the work-region part that satisfies a color criterion;

determining an area of the grass-covered sub-part; and dividing the area of the grass-covered sub-part by the area of the work-region part to obtain a lawn-health value.

16. The method as claimed in claim 3, the working area being a lawn, the method further comprising steps of:

determining a work-region part of the image of the working area that corresponds to the working area;

determining an area of the work-region part;

determining a grass-covered sub-part of the work-region part that satisfies a color criterion;

determining an area of the grass-covered sub-part; and dividing the area of the grass-covered sub-part by the area of the work-region part to obtain a lawn-health value.

17. The robot system as claimed in claim 9, wherein:

the working area is a lawn;

said computing unit is further configured to determine a work-region part of the image of the working area that corresponds to the working area, determine an area of the work-region part, determine a grass-covered sub-part of the work-region part that satisfies a color criterion, determine an area of the grass-covered sub-part, and divide the area of the grass-covered sub-part by the area of the work-region part to obtain a lawn-health value.

18. The robot system as claimed in claim 10, wherein:

the working area is a lawn;

said computing unit is further configured to determine a work-region part of the image of the working area that corresponds to the working area, determine an area of the work-region part, determine a grass-covered sub-part of the work-region part that satisfies a color criterion, determine an area of the grass-covered sub-part, and divide the area of the grass-covered sub-part by the area of the work-region part to obtain a lawn-health value.

* * * * *